(12) United States Patent
Menard et al.

(10) Patent No.: US 9,796,213 B1
(45) Date of Patent: Oct. 24, 2017

(54) MULTIDIRECTIONAL WHEEL ASSEMBLY

(71) Applicants: Matthew Menard, New Bedford, MA (US); Michael Menard, New Bedford, MA (US)

(72) Inventors: Matthew Menard, New Bedford, MA (US); Michael Menard, New Bedford, MA (US)

( * ) Notice: Subject to any disclaimer, the term of this patent is extended or adjusted under 35 U.S.C. 154(b) by 0 days.

(21) Appl. No.: 15/343,366

(22) Filed: Nov. 4, 2016

(51) Int. Cl.
*B60B 33/08* (2006.01)
*B60B 33/00* (2006.01)

(52) U.S. Cl.
CPC .......... *B60B 33/08* (2013.01); *B60B 33/0068* (2013.01); *B60B 2200/43* (2013.01); *B60B 2380/12* (2013.01); *B60B 2900/211* (2013.01); *Y10T 16/1889* (2015.01)

(58) Field of Classification Search
CPC . B60B 33/08; B60B 33/0028; B60B 33/0068; Y10T 16/1889; Y10T 16/1867; Y10T 16/188; Y10T 16/207; Y10T 16/216
USPC .............................. 16/26, 21, 24, 41, 18 CG
See application file for complete search history.

(56) References Cited

U.S. PATENT DOCUMENTS

| | | | |
|---|---|---|---|
| 1,265,850 A | 5/1918 | Wierszewska | |
| 1,412,499 A * | 4/1922 | York | B60B 33/08 16/26 |
| 1,440,641 A * | 1/1923 | Stevens | B60B 33/08 16/26 |
| 1,454,119 A * | 5/1923 | Knaack | B60B 33/08 16/26 |
| 1,460,159 A * | 6/1923 | Karpiej | B60B 33/08 16/26 |
| 1,641,127 A * | 8/1927 | Denslow | A47B 91/14 16/18 CG |
| 2,046,384 A * | 7/1936 | Katcher | B60B 33/00 15/159.1 |
| 2,173,950 A | 9/1939 | Parkhill | |
| 2,423,711 A * | 7/1947 | Knox | B60B 33/08 16/26 |
| 2,451,353 A | 10/1948 | Newell | |
| 2,495,599 A * | 1/1950 | Pinnick | B60B 33/08 16/26 |
| 2,659,926 A | 11/1953 | Wein | |
| 2,779,965 A * | 2/1957 | Schilberg | B60B 33/08 16/24 |
| 2,972,162 A * | 2/1961 | Townsend | F16C 29/046 16/26 |
| 3,417,422 A * | 12/1968 | Dale | B60B 33/08 16/26 |
| 3,557,401 A * | 1/1971 | Jenkins | B60B 33/08 16/26 |
| 3,577,620 A * | 5/1971 | Hoffman | B60B 33/08 16/26 |
| 4,402,108 A * | 9/1983 | Pannwitz | B60B 33/08 16/26 |
| 4,635,496 A * | 1/1987 | McTyre | G06F 3/039 16/26 |

(Continued)

*Primary Examiner* — William Miller

(57) ABSTRACT

A multidirectional wheel assembly for facilitating a cart to be moved in any direction at any time. The assembly includes a cup that is coupled to a leg of a cart. A sphere is rotatably positioned in the cup and the sphere rolls along a support surface. The sphere is rotatable in a selectable direction in the cup to facilitate the cart to be urged in the selectable direction.

7 Claims, 3 Drawing Sheets

(56) References Cited

U.S. PATENT DOCUMENTS

| | | | | |
|---|---|---|---|---|
| 4,996,738 A | * | 3/1991 | Tifre | B60B 33/08 |
| | | | | 16/26 |
| 5,549,331 A | * | 8/1996 | Yun | A63C 17/004 |
| | | | | 16/26 |
| 5,694,662 A | * | 12/1997 | Bordeleau | B60B 33/08 |
| | | | | 16/25 |
| D392,875 S | | 3/1998 | Scott | |
| 5,906,247 A | * | 5/1999 | Inoue | B60B 19/14 |
| | | | | 16/26 |
| 6,568,031 B1 | * | 5/2003 | Polevoy | A47C 19/024 |
| | | | | 16/18 CG |
| 8,533,908 B2 | | 9/2013 | Scicluna | |
| 2005/0060840 A1 | * | 3/2005 | Polevoy | A47C 7/006 |
| | | | | 16/26 |
| 2009/0293227 A1 | * | 12/2009 | Wang | B60B 33/08 |
| | | | | 16/26 |
| 2013/0168521 A1 | | 7/2013 | Wu et al. | |

* cited by examiner

MULTIDIRECTIONAL WHEEL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98

The disclosure and prior art relates to wheel devices and more particularly pertains to a new wheel device for facilitating a cart to be moved in any direction at any time.

BRIEF SUMMARY OF THE INVENTION

An embodiment of the disclosure meets the needs presented above by generally comprising a cup that is coupled to a leg of a cart. A sphere is rotatably positioned in the cup and the sphere rolls along a support surface. The sphere is rotatable in a selectable direction in the cup to facilitate the cart to be urged in the selectable direction.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
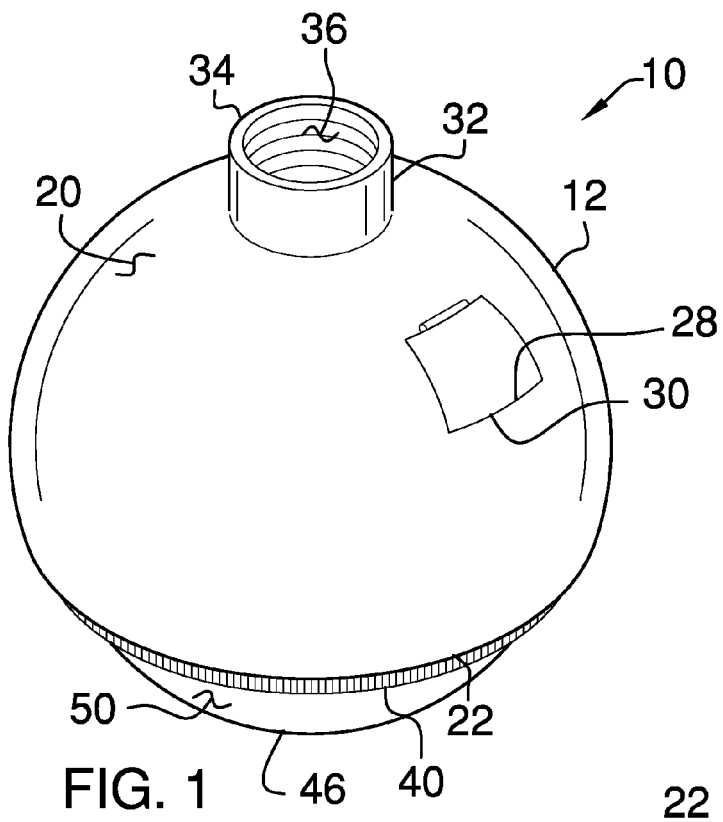
FIG. 1 is a top perspective view of a multidirectional wheel assembly according to an embodiment of the disclosure.
Figure 2:
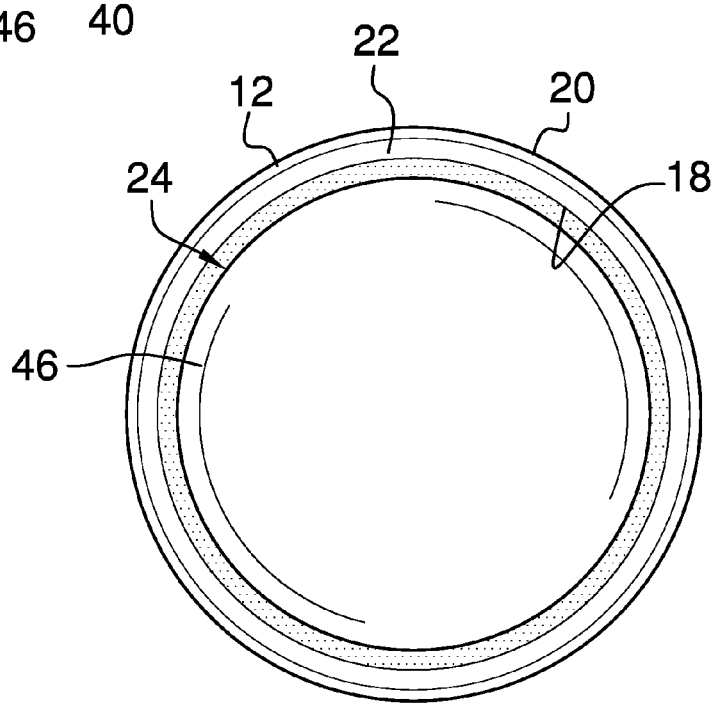
FIG. 2 is a bottom view of an embodiment of the disclosure.
Figure 3:
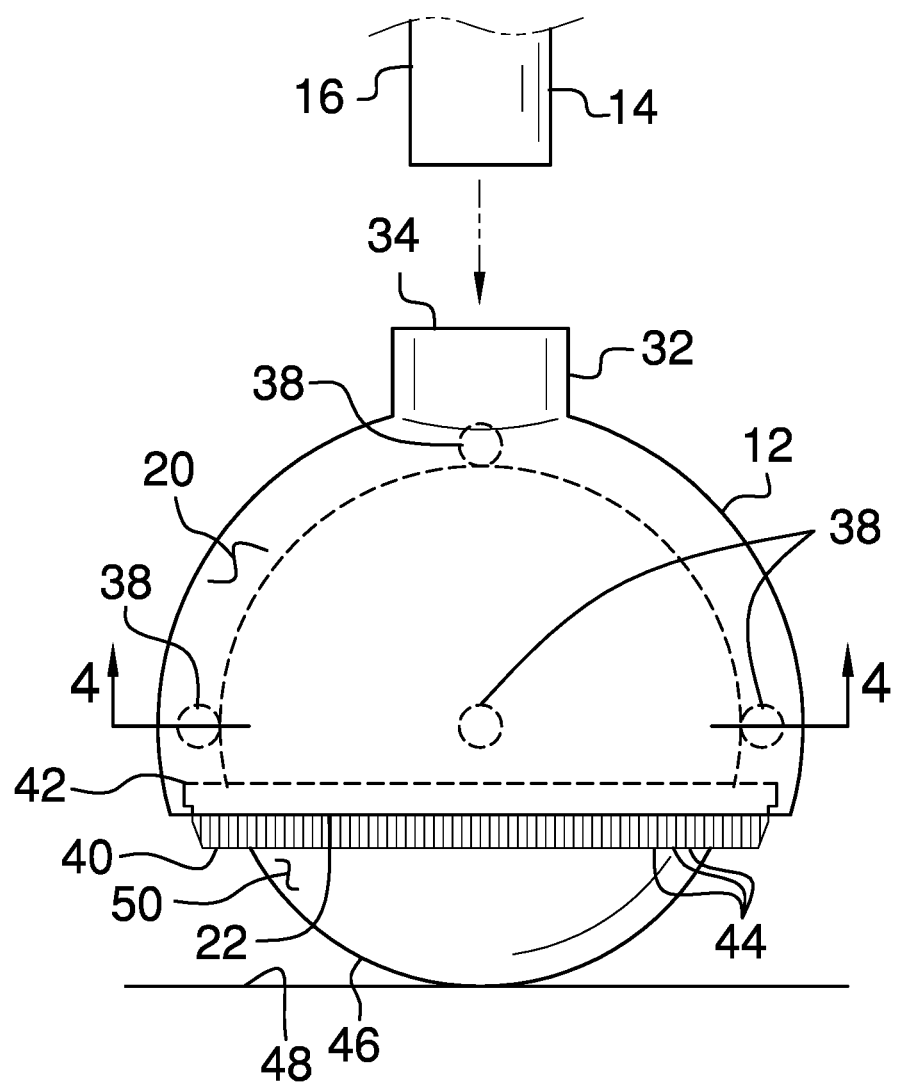
FIG. 3 is a front phantom view of an embodiment of the disclosure.
Figure 4:
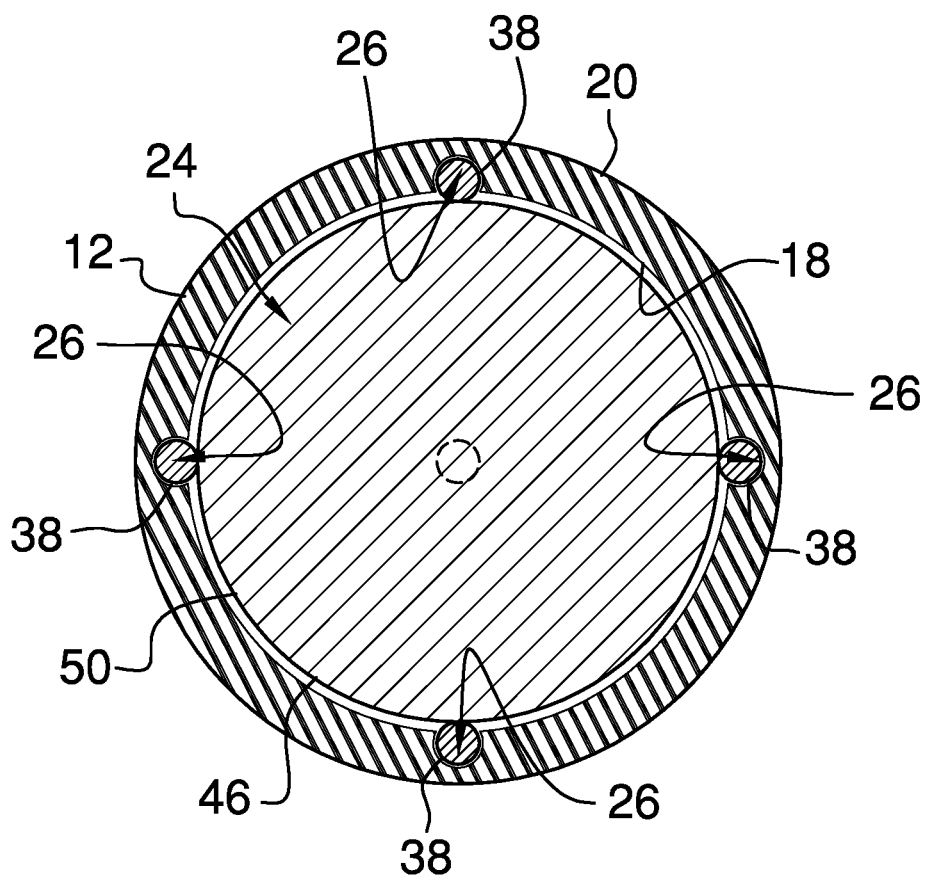
FIG. 4 is a cross sectional view taken along line 4-4 of FIG. 3 of an embodiment of the disclosure.

With reference now to the drawings, and in particular to FIGS. 1 through 4 thereof, a new wheel device embodying the principles and concepts of an embodiment of the disclosure and generally designated by the reference numeral 10 will be described.

As best illustrated in FIGS. 1 through 4, the multidirectional wheel assembly 10 generally comprises a cup 12 that may be coupled to a leg 14 of a cart 16. The cart 16 may be a shopping cart, a wheelbarrow or any wheeled, unpowered vehicle. The cup 12 has an inner surface 18, an outer surface 20 and a perimeter edge 22 extending therebetween. The perimeter edge 22 is continuous such that the perimeter edge 22 defines an opening 24 into the cup 12. The inner surface 18 is concavely arcuate with respect to the perimeter edge 22 such that the cup 12 has a hemispherical interior shape.

The inner surface 18 has a plurality of wells 26 extending toward the outer surface 20 and the wells 26 are spaced apart from each other and are distributed around the cup 12. A hole 28 extends through the outer surface 20 and the inner surface 18. A door 30 is removably coupled to the cup 12 and the door 30 is positioned to cover the hole 28.

A stem 32 is coupled to and extends away from the outer surface 20 of the cup 12. The stem 32 has a distal end 34 with respect to the cup 12 and the distal end 34 is open to insertably receive the leg 14 of the cart 16. The stem 32 is oppositionally positioned with respect to the opening 24 in the cup 12 and the stem 32 has an interior surface 36. The interior surface 36 is threaded to threadably engage the leg 14 of the cart 16.

A plurality of balls 38 is provided and each of the balls 38 is rotatably positioned in an associated one of the wells 26. Moreover, each of the balls 38 extends inwardly beyond the inner surface 18 of the cup 12. Each of the balls 38 may be ball bearings or the like and each of the balls 38 is comprised of a rigid material such as steel or the like.

A brush 40 is removably coupled to the cup 12 to inhibit debris from entering 42 the cup 12. The brush 40 is positioned on the perimeter edge 22 of the cup 12 and the brush 40 is coextensive with the perimeter edge 22. The brush 40 may include a ring 42 that releasably engages the inside surface of the cup 12 adjacent to the perimeter edge 22. The brush 40 may further include a plurality of bristles 44 that are coupled to the ring 42. The bristles 44 may extend downwardly from the perimeter edge 22 of the cup 12.

A sphere 46 is rotatably positioned in the cup 12 and the sphere 46 rolls along a support surface 48. The support surface 48 may be a floor or the like. The sphere 46 is rotatable in a selectable direction in the cup 12 to facilitate the cart 16 to be urged in the selectable direction. Moreover, the sphere 46 facilitates the cart 16 to instantly change direction when the cart 16 is urged along the support surface 48.

The sphere 46 has an outermost surface 50 and the outermost surface 50 has a diameter that is greater than a diameter of the opening 24 in the cup 12. In this way the sphere 46 is retained in the cup 12. Each of the balls 38 rollably engages the outermost surface 50 of the sphere 46 such that each of the balls 38 reduces friction between the sphere 46 and the cup 12. The sphere 46 is comprised of a rigid material such as Teflon, steel, plastic or other material that resists being deformed. A plurality of the assemblies 10 may be provided and each of the plurality of assemblies 10 may be positioned on an associated one of a plurality of legs 14 on the cart 16.

In use, the stem 32 is threaded onto the leg 14 of the cart 16. The sphere 46 engages the support surface 48 and the cart 16 is selectively rolled along the support surface 48. The sphere 46 has a 360 degree angle of rotation with respect to the cup 12. In this way the sphere 46 facilitates the cart 16 to be urged in any direction at any time. Moreover, the balls 38 reduce friction between the sphere 46 and the cup 12 thereby enhancing the cart 16's maneuverability.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A multidirectional wheel assembly being configured to be coupled to a cart thereby facilitating the cart to turn in any direction, said assembly comprising:
    a cup being configured to be coupled to a leg of the cart, said cup having an inner surface, an outer surface and a perimeter edge extending therebetween, said perimeter edge being continuous such that said perimeter edge defines an opening into said cup, said inner surface being concavely arcuate with respect to said perimeter edge such that said cup has a hemispherical interior shape, said cup having a hole extending through said outer surface and said inner surface;
    a sphere being rotatably positioned in said cup, said sphere being configured to roll along a support surface, said sphere being rotatable in a selectable direction in said cup wherein said sphere is configured to facilitate the cart to be urged in the selectable direction; and
    a door being removably coupled to said cup, said door being positioned to cover said hole.

2. The assembly according to claim 1, wherein said inner surface has a plurality of wells extending toward said outer surface, said wells being spaced apart from each other and being distributed around said cup.

3. The assembly according to claim 2, further comprising a plurality of balls, each of said balls being rotatably positioned in an associated one of said wells such that each of said balls extends inwardly beyond said inner surface of said cup.

4. The assembly according to claim 3, wherein said sphere has an outermost surface, said outermost surface having a diameter being greater than a diameter of said opening in said cup such that said sphere is retained in said cup, each of said balls rollably engaging said outermost surface of said sphere such that each of said balls reduces friction between said sphere and said cup.

5. The assembly according to claim 1, further comprising a stem being coupled to and extending away from said outer surface of said cup, said stem having a distal end with respect to said cup, said distal end being open wherein said distal end is configured to insertably receive the leg of the cart, said stem being oppositionally positioned with respect to said opening in said cup.

6. The assembly according to claim 1, further comprising a brush being coupled to said cup wherein said brush is configured to inhibit debris from entering said cup, said brush being positioned on said perimeter edge of said cup, said brush being coextensive with said perimeter edge.

7. A multidirectional wheel assembly being configured to be coupled to a cart thereby facilitating the cart to turn in any direction, said assembly comprising:
    a cup being configured to be coupled to a leg of the cart, said cup having an inner surface, an outer surface and a perimeter edge extending therebetween, said perimeter edge being continuous such that said perimeter edge defines an opening into said cup, said inner surface being concavely arcuate with respect to said perimeter edge such that said cup has a hemispherical interior shape, said inner surface having a plurality of wells extending toward said outer surface, said wells being spaced apart from each other and being distributed around said cup, said cup having a hole extending through said outer surface and said inner surface;
    a door being removably coupled to said cup, said door being positioned to cover said hole;
    a stem being coupled to and extending away from said outer surface of said cup, said stem having a distal end with respect to said cup, said distal end being open wherein said distal end is configured to insertably receive the leg of the cart, said stem being oppositionally positioned with respect to said opening in said cup;
    a plurality of balls, each of said balls being rotatably positioned in an associated one of said wells such that each of said balls extends inwardly beyond said inner surface of said cup;
    a brush being coupled to said cup wherein said brush is configured to inhibit debris from entering said cup, said brush being positioned on said perimeter edge of said cup, said brush being coextensive with said perimeter edge; and
    a sphere being rotatably positioned in said cup, said sphere being configured to roll along a support surface, said sphere being rotatable in a selectable direction in said cup wherein said sphere is configured to facilitate the cart to be urged in the selectable direction, said sphere having an outermost surface, said outermost surface having a diameter being greater than a diameter of said opening in said cup such that said sphere is retained in said cup, each of said balls rollably engaging said outermost surface of said sphere such that each of said balls reduces friction between said sphere and said cup.

* * * * *